US008756086B1

(12) United States Patent
Feldman et al.

(10) Patent No.: US 8,756,086 B1
(45) Date of Patent: Jun. 17, 2014

(54) SYSTEM AND METHOD TO EVALUATE THE EFFECTIVENESS OF A GIVEN ADVERTISING SOURCE IN GENERATING SALES LEADS AND MONITORING HOW SALES LEADS WERE HANDLED INCLUDING PROVIDING TRAINING TO IMPROVE SALESPERSON EFFECTIVENESS AND FOLLOWUP REPORTING TO MONITOR SALES EFFORTS AND TRAINING

(75) Inventors: Jerry Feldman, Westlake, CA (US); Mark Powers, Thousand Oaks, CA (US); Elliot Leiboff, Westlake Village, CA (US)

(73) Assignee: CallSource, Inc., Westlake Village, CA (US)

( * ) Notice: Subject to any disclaimer, the term of this patent is extended or adjusted under 35 U.S.C. 154(b) by 867 days.

(21) Appl. No.: 12/583,230

(22) Filed: Aug. 17, 2009

(51) Int. Cl.
*G06Q 10/00* (2012.01)
(52) U.S. Cl.
USPC ............ 705/7; 705/8; 705/9; 705/10; 705/11; 705/14

(58) Field of Classification Search
USPC .................................. 705/7, 8, 9, 10, 11, 14
See application file for complete search history.

(56) References Cited

U.S. PATENT DOCUMENTS

| 2002/0077998 | A1* | 6/2002 | Andrews et al. | 707/1 |
| 2006/0047579 | A1* | 3/2006 | Dresden | 705/26 |
| 2008/0292070 | A1* | 11/2008 | Winter et al. | 379/88.14 |
| 2009/0089135 | A1* | 4/2009 | Minert et al. | 705/9 |
| 2009/0319344 | A1* | 12/2009 | Tepper et al. | 705/11 |

* cited by examiner

*Primary Examiner* — Nga B. Nguyen
(74) *Attorney, Agent, or Firm* — Thomas I. Rozsa

(57) ABSTRACT

A system evaluate the effectiveness of a given advertising source in generating sales leads and monitoring how the sales leads were handled. Providing a detailed computerized system to provide reports to customer's managers to advise them how effective a given advertising program or medium was in generating sales leads and to advise them how many responses were genuine potential customers interested in buying the product or service. Also providing a system to monitor how sales lead were handled by sales personnel including evaluation on how a sales call was handled and if a sales lead was successfully completed as a sale.

16 Claims, 7 Drawing Sheets

SYSTEM AND METHOD TO EVALUATE THE EFFECTIVENESS OF A GIVEN ADVERTISING SOURCE IN GENERATING SALES LEADS AND MONITORING HOW SALES LEADS WERE HANDLED INCLUDING PROVIDING TRAINING TO IMPROVE SALESPERSON EFFECTIVENESS AND FOLLOWUP REPORTING TO MONITOR SALES EFFORTS AND TRAINING

BACKGROUND OF THE INVENTION

1. Field of the Invention

The present invention relates to the field of marketing products and services and more particularly to the field of providing a system and method to track the effectiveness of advertisements, determining how the leads generated from advertisements were handled by a salesperson and improving the selling skills of the salesperson.

2. Description of the Prior Art

To the best of the present inventors' knowledge, the present invention is totally unique and no-one has created a totally effective integrated marketing analysis and followup system in accordance with the present invention.

SUMMARY OF THE INVENTION

The present invention is a system and method to evaluate the effectiveness of a given advertising source in generating sales leads and monitoring how the sales leads were handled. The present invention provides a detailed computerized system to provide reports to customer's managers to advise them how effective a given advertising program or medium was in generating sales leads and to advise them how many responses were genuine potential customers interested in buying the product or service advertised as opposed to mistaken calls and other calls which were not genuine sales leads.

The present invention also provides a system to monitor how sales lead were handled by sales personnel including evaluation on how a sales call was handled and if a sales lead was successfully completed as a sale. The system also enables a sales call to be recorded and evaluated by sales professionals or speech analytics software. The system also provides recommendations on improving the selling skills of a salesperson and provides training to improve the selling skills of the sales personnel. The present invention also provides a followup method to determine if the salesperson benefitted from the training and improved their selling skills. The system also provides analysis and recommended courses of action for salespersons and managers including promotion, remaining at the same position, transfer to another position, or termination.

It is an object of the present invention to provide a system and method to track inbound calls from a potential customer (and return calls from a salesperson to that customer) to determine if the calls were responsive to a given advertisement or advertising program placed by the customer to thereby determine the effectiveness of the advertisement or advertising program.

It is also an object of the present invention to provide a method to determine if an incoming call was a genuine sales inquiry in response to marketing or some other call such as a mistake, person seeking general information, etc.

It is a further object of the present invention to provide a system and method to enable an incoming call or return call to be recorded and to provide a way to respond to the call if a salesperson of the customer is not available to handle the call when it comes in.

It is an additional object of the present invention to provide a system and method to monitor how a sales call was handled by a salesperson for a customer and to advise appropriate levels of management on how a salesperson handled the call.

It is a further object of the present invention to provide a performance analysis of each salesperson in a customer's sales staff at different levels of sales as to how each salesperson handled incoming sales inquiries and to provide a grading score on the salesperson's performance. The system also provides individual reports on each salesperson to enable management to determine if the salesperson is performing his/her job, if they are deficient in an area for which improvement can be made.

It is another object of the present invention to provide an educational training system which provides online customized courses to enable a salesperson to improve their skills in one or more areas where the monitoring of that person has determined that the salesperson needs improvement. It is also within the capabilities of the present invention system to provide one or more followup tests to confirm that the salesperson did take the course and that the salesperson learned the skills which were taught in the course. The system also provides reporting the results to the appropriate level of management of the customer so that the progress of each salesperson in learning an area where the persons needed improvement can be determined and monitored.

The system provides flexibility to combine computer generated monitoring and learning with reporting of live interaction between the salesperson and training employees of the provider.

The system also provides flexibility to integrate any special training program of the customer with the programs generated by the provider.

The system also provides automatic followup and reminder on each portion of the program to be sure nothing is missed by the customer.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is a totally unique integrated automatic software controlled system which can include live person input, to track advertisements for a person or business providing a product or service and to evaluate the effectiveness of an advertisement or advertising campaign, and to monitor and determine how effectively a sales lead was handled by a salesperson. The system also provides online training to improve the selling skills of a salesperson and to advise the salesperson and the business or entity employing the salesperson which salespeople are most effective and also provides a system to improve the selling skills of salespeople.

Figure 1:
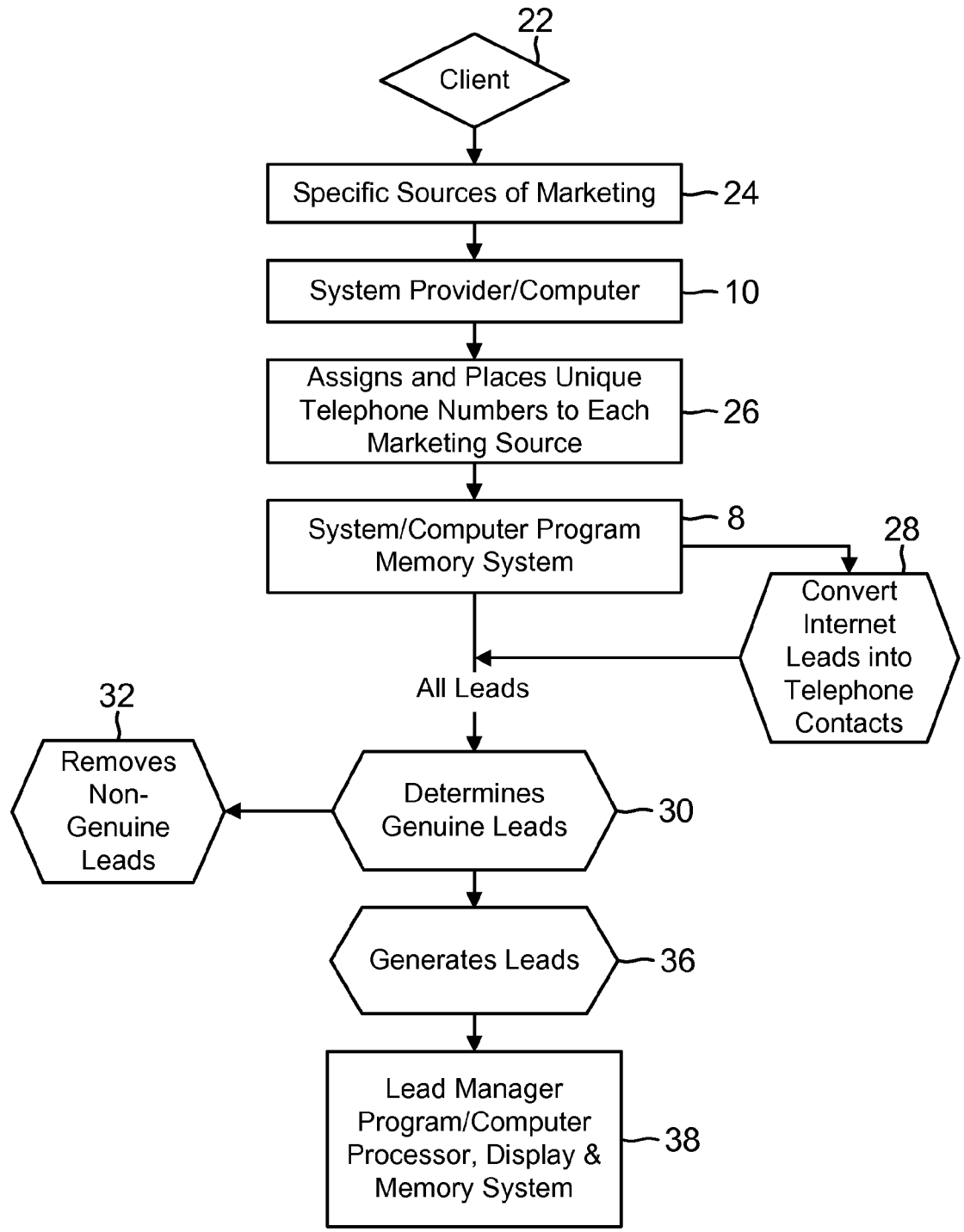
FIG. 1 is a block diagram of a portion of the present invention integrated marketing analysis and followup system.
Figure 1A:
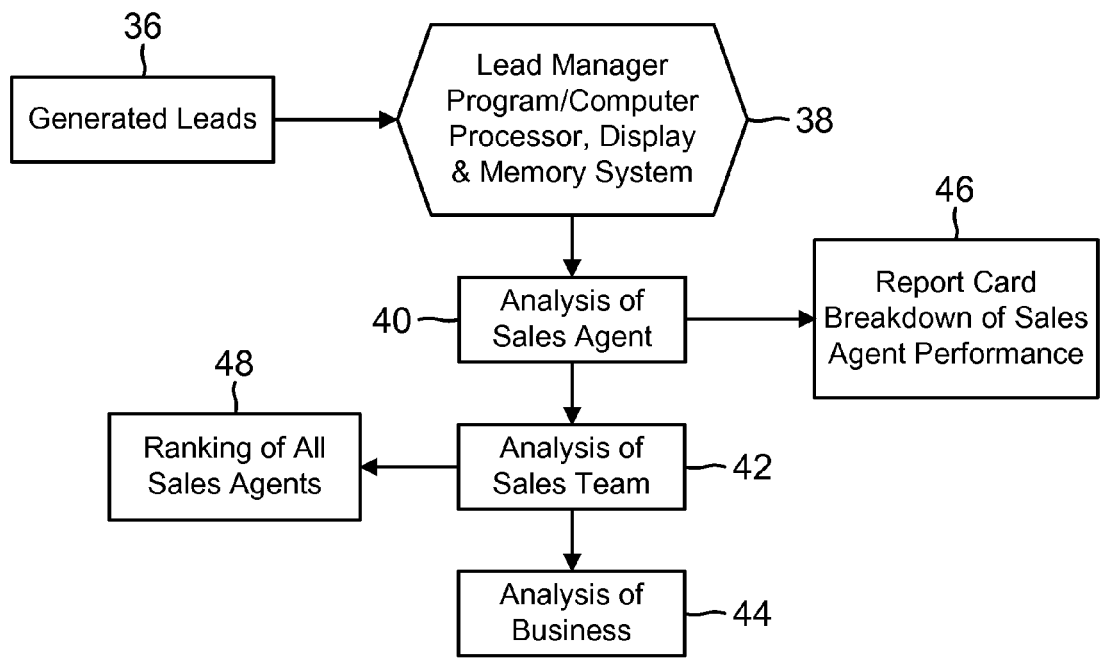
FIG. 1a is a continuation block diagram of the present invention integrated marketing analysis and followup system.

The present invention is disclosed in the block diagram of FIG. 1 and FIG. 1a and the flow charts of FIGS. 2A, 2B, 2C, 2D and 2E. Referring to FIGS. 1 and 1a, the process begins with the assignment of a series of local and/or toll-free telephone numbers to a customer or client businesses 22 of the invention system provider 10. The specific sources of marketing 24 of the client business 22 are determined. The provider 10 assigns and places a unique telephone number 26 in each source of marketing or advertising 24. The system 8 automatically routes, tracks and records calls to or from customers or prospective customers. Internet leads 28 are automatically converted to telephone contacts and/or captured, managed and reported. The system 8 determines which calls are mistakes or people seeking free advice as opposed to genuine potential customers. Calls representing sales opportunities 30 are separated from other types of calls which are removed 32, allowing for accurate cost-per-lead analysis by marketing source and precise closes-per-lead by sales agent. Leads 36 are assigned and managed by an internal lead management program 38 and/or forwarded to an external lead management or CRM program. Analysis of the sales performance of each salesperson 40 of the client business 22 are analyzed and each individual sales agent 40, sales team 42 and business 44 receives a report card 46 and ranking 48. Each sales agent's 40 skill gaps are identified and related training courses are recommended, delivered and tracked via a hosted learning management system. A unique feature of the present invention is that it establishes a performance baseline for each employee 40, identifies true sales opportunities, measures telephone skills, delivers targeted training, tracks employee education, and then repeats the entire cycle every month or in real time with live agents or speech analytics.

A detailed flow chart of the components of the present invention system 8 is set forth in FIGS. 2A through 2E. The system 8 comprises various sub-combination packages which the business 22 may subscribe to or elect not to subscribe to. The following discussion will set forth each sub-combination package in detail and the features it provides.

Figure 2A:
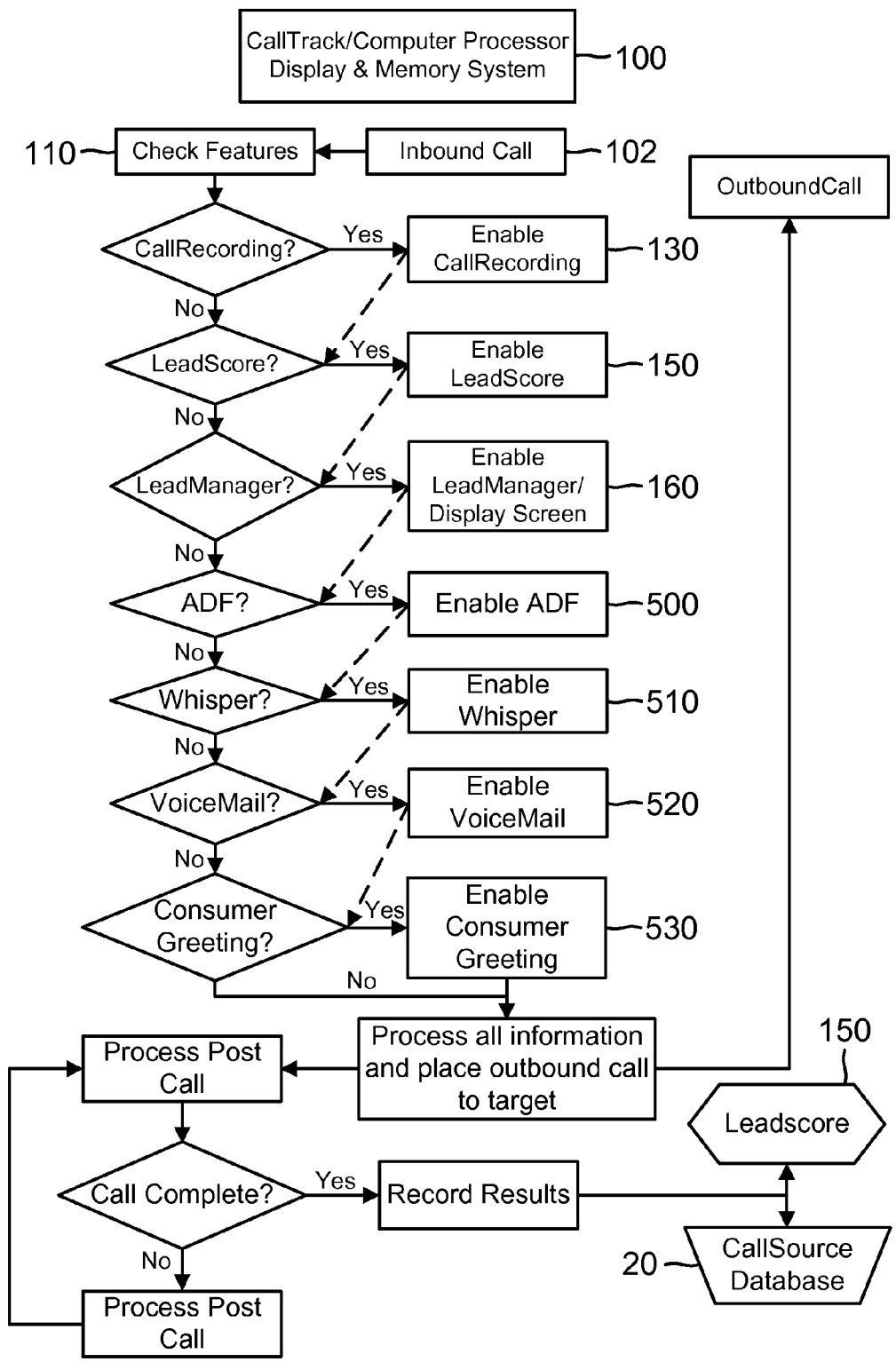
FIG. 2A is a flow chart of the CallTrack subroutine of the present invention integrated marketing analysis, followup system and educational training.

Referring to FIG. 2A, the first package of features is provided under the heading Calltrack 100. Whenever an inbound call from a potential customer 102 dials a local or toll-free number 26 which has been assigned to a specific source of marketing 24 for a specific client business/customer 22 which has been set up in the system database, the system 8 routes the call according to the telephone number of the client business 22. The system 8 then provides a check features function 110 which reports, via ad-hoc Internet access and/or scheduled e-mail delivery the day, time and duration of each call 102, identifying the marketing source 24 in which the number 26 was listed, the telephone number of the caller 102 and when available, the caller's name and address as determined by reverse lookup from the caller's telephone number. Additionally, the caller's 102 geographic location and neighborhood demographics are reported to each customer 22.

One option available to the customer 22 is the Enable Callrecording 130 feature. Inbound calls 102 are greeted with a notice of recording and are saved in a compressed, digital format. The customer 22 can select which response the inbound call 102 will receive depending on the specific circumstances of the customer 22 when the inbound call 102 comes in. Inbound calls 102 are routed according to customer 22 defined rules which include alternate routing the call based on ring—no answer, busy status, business hours, nearest location or other options in the customer's call receiving menu. Calls maybe preceded by a pre-recorded greeting to the caller the business 22, or both. Outbound, return calls from the business 22 to a customer or prospect are generated by the system via Web interface and are tracked and reported along with the inbound calls 102. Traffic data can be delivered via ftp or XML to external systems, such as CRM software, and/or the lead management program which is an optional feature of the provider 8 which the customer 22 can subscribe to.

Referring again to the flow chart of FIG. 2A, the customer 22 can subscribe to the LeadScore 150 feature of the provider 8. With the LeadScore 150 feature, all recorded calls which have been recorded based on the Enable Callrecording feature 130 are reviewed by human analysis and/or speech analytics software to determine whether they are, in fact, valid business leads. Wrong number calls, repeat calls, personal calls, vendor calls, etc. (all non-prospect calls), are identified, quantified and excluded from the lead database. Qualified leads are forwarded to internal and/or external management systems which is another option the customer 22 can subscribe to. This allows accurate measurement of cost-per-lead by ad source and marketing campaign as well as closes-per-lead by agent.

Figure 2B:
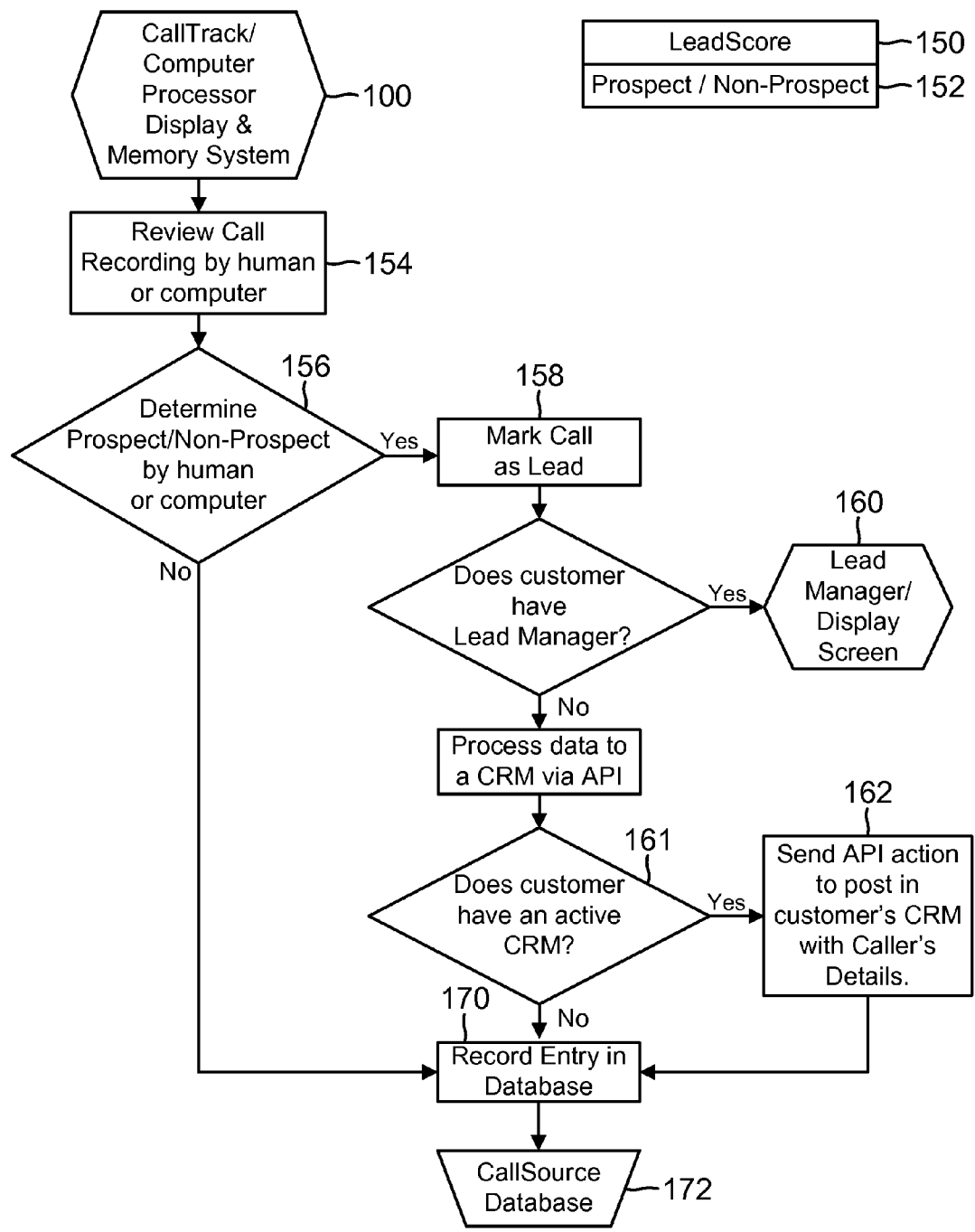
FIG. 2B is a flow chart of the LeadScore subroutine of the present invention integrated marketing analysis, followup system and educational training.
Figure 2C:
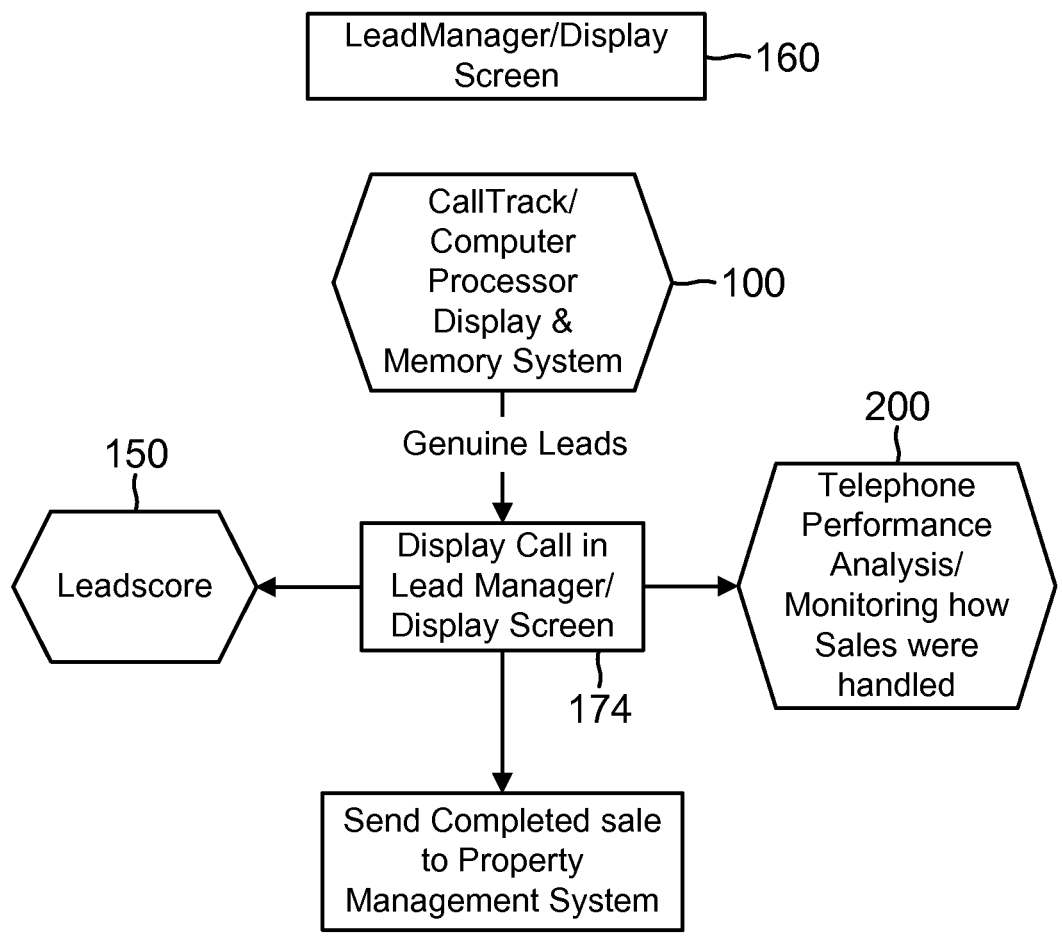
FIG. 2C is a flow chart of the LeadManager subroutine of the present invention integrated marketing analysis, followup system and educational training.

Referring to the LeadScore 150 subroutine illustrated in FIG. 2B, the subroutine Prospect/Nonprospect subroutine 152 illustrated in FIG. 2B, the call recording is reviewed 154 by either human or computer to determine if the caller 102 is a viable prospect 156 or not. If the caller 102 is a viable lead, then the call is marked as a lead 158. If the customer 22 has subscribed to the provider's 8 LeadManager software, the lead 158 is forwarded to the LeadManager 160 program as illustrated in FIG. 2C. If the customer 22 has not subscribed to the LeadManager 160 program, the program determines if the customer 22 has its own lead management or CRM program 161 and if the customer does, then the lead 158 is processed to the customer's lead management or CRM program 162 and inputs the details of the caller 102 for followup. If the customer, does not have its own lead management or CRM program, then the call details are recorded 170 in the provider's database.

If the customer 22 has subscribed to the provider's 8 LeadManager program 160, then concurrently with the routing of the telephone call 102, the system screen pops a lead-entry form on a computer at the site of the customer 22. The entry form to display call in LeadManager 174 is pre-populated with call detail record data, including day, date, hour, marketing campaign, caller telephone number, and when available, caller name and address. Sales agents 40 at the business location 22 can correct this default data and enter additional qualifying information into the lead record. The CallTrack 100 program also captures and automatically replies to leads submitted via Internet, and identifies, by captured data, customers or prospective customers who contact the business 22 multiple times, even if by multiple means such as via Web, telephone, or personal appearance. A specific sales agent 40 is assigned to follow up each lead 158 and user-defined rules establish how and when reminders are delivered to the agent 40 and the agent's manager. Businesses 22 with their own CRM software or third-party lead manager software can use the provider's 8 LeadManager 160 software in combination with such external systems, or can bypass the LeadManager 160 software with an ftp or XML feed.

One specific type of customer program feature for automobile dealerships is illustrated in FIG. 2A. With ADF 500, when a prospective customer calls an auto dealership customer, an e-mail is generated and sent to the auto dealership to advise the auto dealership of the potential customer and the source of advertising that generated the lead. The Whisper program 510 takes a message from the potential leads/customer and generates a return call from a sales agent. If no sales agent is available, the program directs the potential lead to a voice mail 520 and then a special greeting to the potential customer is generated to assure the potential customer that his inquiry will be answered. A customized pre-recorded greeting 530 is then generated to the potential customer. These specific sub-programs are customized for automobile dealerships. It will be appreciated that it is within the spirit and scope of the present invention to have numerous other customized programs which are tailored to specific businesses, general service providers and professional service providers such as doctors.

Figure 2D:
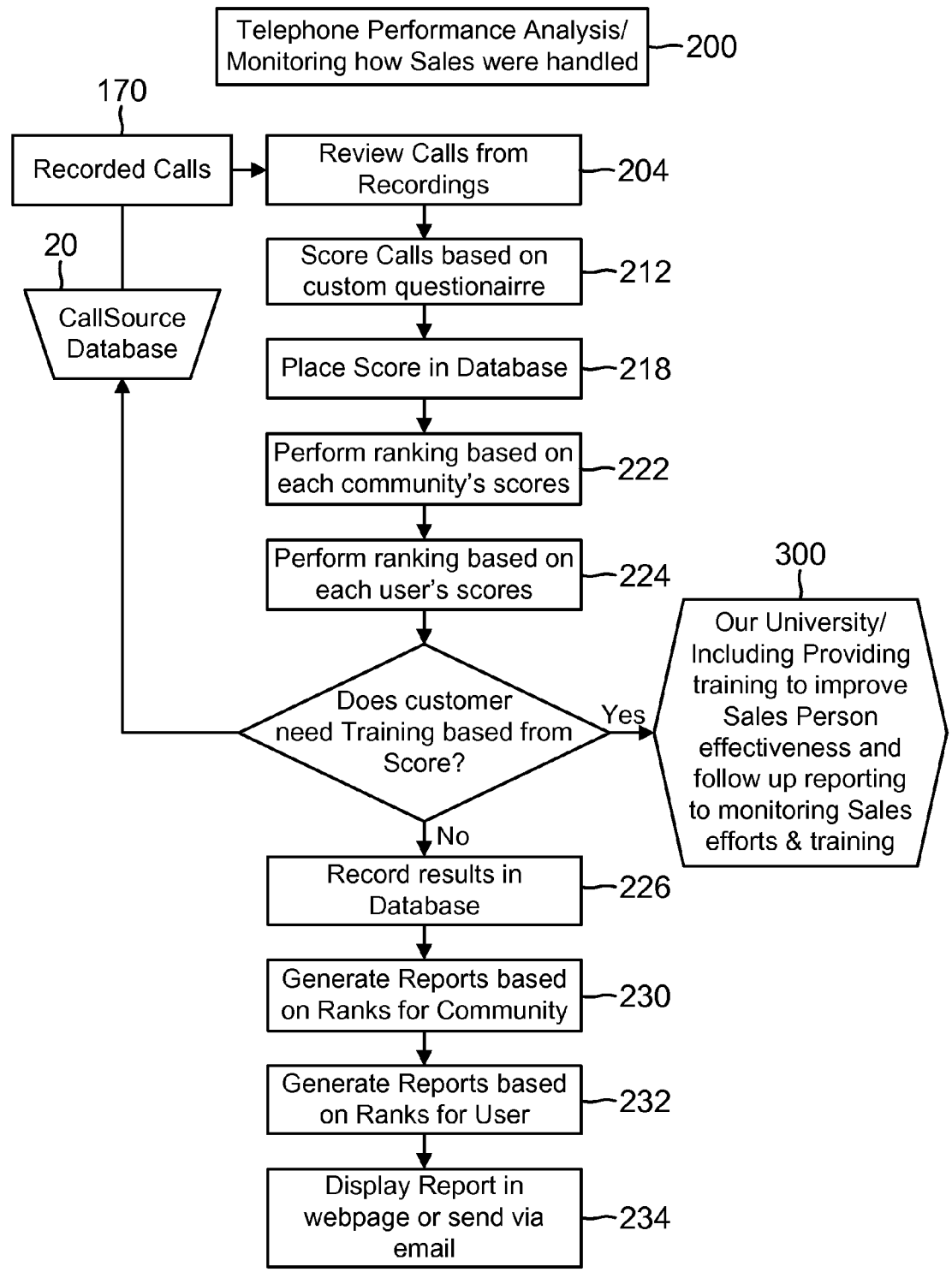
FIG. 2D is a flow chart of the Telephone Performance Analysis of the present invention integrated marketing analysis, followup system and educational training.

After the LeadManager 160 program subroutine is completed and any customized program for a specific business or service is completed, the provider 8 then provides a Telephone Performance Analysis (TPA) to the customer 22. The Telephone Performance Analysis subroutine is illustrated in FIG. 2D. With the telephone performance analysis 200 program, recorded calls 170 are reviewed by human analysis 204 or by speech analytics software. A Web-accessed tool selects the audio files by various user defined filters (e.g. minimum call duration, agent identification code, etc.) and present a scoring entry screen 212. Review and scoring can also be accomplished using speech analytics software. Scoring criteria are user-defined and typically assess how effectively the agent established rapport, gathered and shared information, overcame objections, controlled the call, and drove to a sale or appointment. Calls are scored based on a customer questionnaire. Scores are then placed in a score database 218. Data 218 are then presented in the form of an agent performance report card. Sales agent, business location, and company performance can be ranked against one another and against industry averages. Ranking 222 is performed based on scores in each location or region for a given business. In addition, ranking 224 is performed based on scores of each user. Each agent's 40 individual skill gaps are identified and specific training and coaching are recommended. The results are recorded in a database 226. Reports 230 are generated based on the ranks for a given business community. Reports 232 are generated based on ranks for a given user. The reports are displayed on a web page 234 accessible to the user or sent via an e-mail to the user/customer. The report cards are present monthly, identifying trends and monitoring the capabilities of the agent 40 and the effectiveness of the training. Performance reports are posted to a client-branded learning management system referred to as Our University 300.

The reports are also grouped by level of personnel. An individual salesperson gets his/her report. The manager of a sales team gets the reports of all sales personnel in the manager's team. A division head gets the reports of all managers and the sales personnel under manager. The reports are grouped in this manner with higher management personnel getting reports for all sub-managers and individuals under the sub-manager.

Figure 2E:
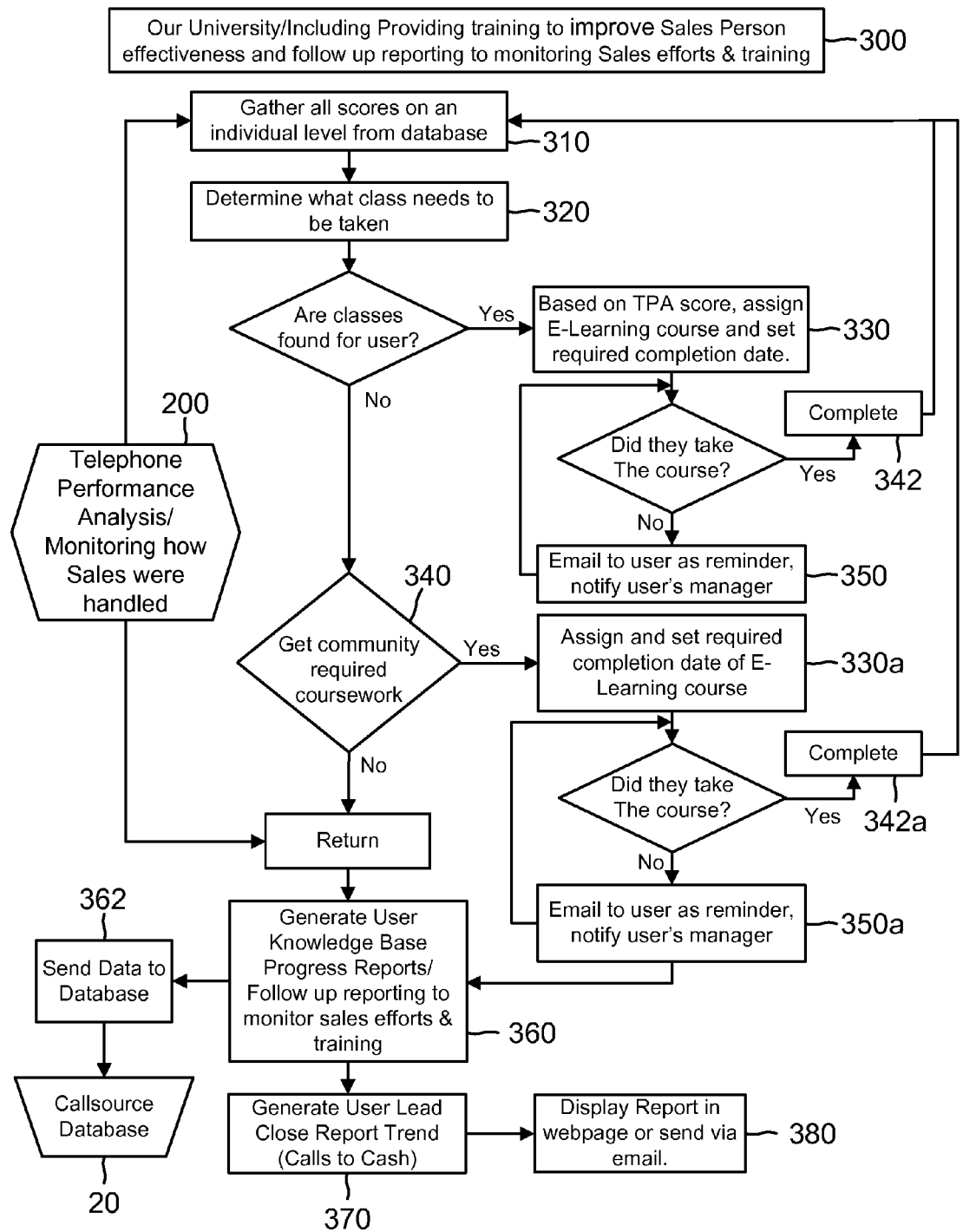
FIG. 2E is a flow chart of the Our University subroutine of the present invention integrated marketing analysis, followup system and educational training.

In general, referring to FIG. 2E, a private label university 300 is established. All scores 310 on an individual level are gathered from the database. The provider 8 in conjunction with the customer 22 determine what classes need to be taken in step 320. If classes, are found, then a completion date 330 for all courses are assigned to a salesperson 40 based on the telephone performance analysis score. If classes are not found, course work 340 is provided. Followup is performed to determine if the salesperson took and completed 342 the required courses and the salesperson's manager is notified by e-mail 350. These steps are repeated as designated by 330A, 342A and 351A until all courses are completed. This subroutine is repeated for each of the required courses for each individual salesperson. The provider 8 generates a user's knowledge base program report 360. A send data to database step 362 sends the data to the providers' database. The provider 8 generates a user lead close report trend 370 and the provider 8 displays the report on a web page or e-mail 380 sent to the customer 22 and the appropriate management level person(s).

A unique feature of the present invention is the creation of a hosted learning management system by the provider 8 called Our University 300. The unique Our University 300 system is a hosted, learning management system. Custom branded to match the website of the client business, Our University 300 provides a unique web page for each client 22 employee 40, featuring a digital photograph of the employee 40, various customizable fields, plus a list of all required or recommended training associated with the employee's job title/position. Job titles can be imported from the client's human resources or payroll system so that training requirements are automatically updated. As set forth above, the web page indicates the required completion date and completion status of each course. If the client elects to use the provider's training content, a self-paced course can be launched directly from the page by clicking a button beside the course title. Instructor-led courses can be scheduled by clicking a calendar button.

Each employee is further given pre- and post-learning tests to be sure they learned the course material. Completion certificates are provided to management to advise management which employees have or have not completed training, as well as how each employee scored on pre- and post-learning examinations. Training from external providers can be imported automatically in the Our University 300 program and ad hoc classes can be added by the client 22. Content provided by the provider 8 primarily targets the skills that are assessed in the Telephone Performance Analysis program 200, as well as regulatory compliance subjects. The client business 22 can also run any of its own SCORM-compliant training classes via Our University 300.

Defined in detail, the present invention is a system run by a provider to improve a business customer's sales, comprising: (a) running a detailed computerized system to provide reports to a business customer to advise the business customer how effective a given advertising program or advertising medium was in generating sales lead calls and to advise the business customer how many responses were genuine potential customers interested in buying a product or service advertised as opposed to mistaken calls and other calls which were not genuine sales leads; (b) providing a detailed call record including day, date, hour, marketing campaign, caller telephone number and other caller information and assigning a sales agent to follow up on a customer lead; (c) monitoring how sales leads were handled by sales personnel including evaluation on how a sales call was handled and if a sales lead was successfully completed as a sale; (d) providing recommendations on improving the selling skills of a salesperson; (e) providing training to improve the selling skills of the sales personnel; and (f) providing followup to determine if the salesperson benefitted from the training and improved their selling skills.

Defined broadly, the present invention is the system supplied by a provider to a business customer, comprising: (a) providing an integrated automatic software controlled system to track advertisements for a business customer advertising a product or service and to evaluate the effectiveness of an advertisement or advertising campaign, providing monitoring to determine how effective a sales lead was handled by a salesperson, and providing online training to improve the selling skills of a salesperson and to advise the salesperson and the business customer about the selling skills of the salesperson and providing a system to improve the selling skills of the salesperson.

Defined more broadly, the present invention is a system supplied by the provider to a business customer, comprising: (a) assigning of a series of local and/or toll-free telephone numbers to client of the provider; (b) identifying specific sources of marketing ad advertising of the client; (c) the provider assigning and placing at least one a unique telephone number in each source of marketing or advertising; (d) automatically routing, tracking and recording calls from a prospective customer in response to a client's marketing or advertisement; (e) determining which calls are mistakes or people seeking free advice as opposed to genuine potential customers; and (f) performing cost-per-lead analysis by marketing source.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A computer system for improving a client business managed by salespersons and sales teams, comprising:
   a. a computer processor;
   b. a display;
   c. a memory system having instructions which when executed, cause the computer to perform multiple programs to evaluate the effectiveness of a given advertising source in generating sales leads and monitoring how sales leads were handled including providing training to improve salesperson effectiveness and followup reporting to monitor sales efforts and training, said programs;
   d. said programs analyzing performance of each of said salespersons, each of said sales teams and said business, and further capable of assigning and managing leads which are optionally forwarded to an external lead management program;
   e. said programs assigning a series of local and/or toll-free telephone numbers to a client or said client business of a provider which provides said system to thereby determine specific sources of marketing of said client business, said provider assigning and placing a unique telephone number in each source of marketing or advertising;
   f. said programs routing, tracking and recording calls to or from clients or prospective clients, including automatically converting Internet leads to telephone contacts which are thereby captured, managed and reported;
   g. said programs determining which calls are mistakes or people seeking free advice as opposed to potential clients, wherein calls representing sales opportunities are separated from other types of calls which are removed to allow for a cost-per-lead analysis by marketing source and a closes-per-lead analysis by a salesperson; and
   h. said programs performing when said client or said client business having an inbound call from dialing a local or toll free number assigned to a source of marketing for said client business or said client which has been set up in a database of said system, said system routing a call according to a telephone number of said client, or said client business, said system further providing a check feature function which reports, via ad-hoc Internet access and/or scheduled e-mail delivery a day, time and duration of each call, identifying said source of marketing in which said telephone number has been listed, wherein a name and address of said potential client being determined by a reverse lookup from said telephone number of said potential client in addition to a geographic location and neighborhood demographics being reported to each of said client.

2. The computer as claimed in claim 1, said programs further comprising: capturing and automatically replying to said leads submitted via Internet, and identifying by captured data, customers or prospective customers who contact said business multiple times, even if by multiple means such as via Web, telephone, or personal appearance.

3. The computer as claimed in claim 2, said programs further comprising: assigning a specific sales person to follow up each of said leads and user-defined rules establishes how and when reminders are delivered to said salesperson and a manager of said sales person.

4. The computer as claimed in claim 1, said programs further comprising: a first subprogram for said client or said client business who has called said inbound call with a notice of recording saved in a compressed and digital format.

5. The computer as claimed in claim 4, said programs further comprising: a second subprogram for a human or a speech analytics software to review said recorded calls to thereby determine a portion of said recorder calls which are valid business leads that are further forwarded to said internal and/or external lead manager programs.

6. The computer as claimed in claim 5, said programs further comprising: third subprogram for said client or client business to display call in at a fourth subprogram with a detailed recorded data of said call, including day, date, hour, marketing campaign, caller telephone number, and when available, caller name and address, wherein each of said salespersons are capable of correcting a default data and entering additional qualifying information into the lead record for said client or said client business.

7. The computer as claimed in claim 6, said programs further comprising: a fourth subprogram for sales business in an automobile dealership, when a prospective customer calls said automobile dealership by using said third subprogram, an email is generated and sent to said dealership thereby advising said dealership of said prospective customer and a source of advertising that generates a lead.

8. The computer as claimed in claim 7, said programs further comprising: a fifth subprogram to take a message from said potential customer.

9. The computer as claimed in claim 8, said programs further comprising: a sixth subprogram when there is an absence of an available salesperson, said subprogram directs said potential customer to a voice mail.

10. The computer as claimed in claim 9, said programs further comprising: a seventh subprogram wherein a special greeting to said potential customer is generated to assure said potential customer that the customer's inquiry will be answered.

11. A computer system for improving a client business managed by salespersons and sales teams, comprising:
   a. a computer processor;
   b. a display;
   c. a memory system having instructions, which when executed, cause the at least one computer to perform multiple programs to evaluate the effectiveness of a given advertising source in generating sales leads and monitoring how sales leads were handled including providing training to improve salesperson effectiveness and followup reporting to monitor sales efforts and training;
   d. said programs analyzing performance of each of said salespersons, each of said sales teams and said client business, and further capable of signing and managing leads which are optionally forwarded to an external lead management program;
   e. said programs assigning a series of local and/or toll-free telephone numbers to a client or said client business of a provider which provides said system to thereby determine specific sources of marketing of said client business, said provider assigning and placing a unique telephone number in each source of marketing or advertising;
   f. said programs routing, tracking and recording calls to or from clients or prospective clients, including automatically converting Internet leads to telephone contacts which are thereby captured, managed and reported;
   g. said programs determining which calls are mistakes or people seeking free advice as opposed to potential customers, wherein calls representing sales opportunities are separated and recorded from other types of calls which are removed to allow for a cost-per-lead analysis by marketing source and a closes-per-lead analysis by a salesperson; and
   h. in said analysis there is included a human or a speech analytics software to review said recorded calls and thereby classify performance of the respective salespersons based on a client questionnaire with the respective scores, wherein classifying criteria are client-defined and assess how effectively said salesperson established a report, gathered and shared information, overcame objections, controlled said call, and devoted time to a sale or appointment, said scores are placed in a database of said system wherein data are presented in a form of a salesperson performance report card, so that ranking is performed based on scores in each location or region for a given client business, or ranking is performed based on scores of each salesperson so that each salesperson's individual skill gaps are identified and specific training and coaching are recommended.

12. The computer as claimed in claim 11, said programs further comprising: recording and reporting results of performance in said database, reports are generated based on ranks for a given business community, reports are generated based on ranks for the respective salesperson, said reports are displayed on a web page on a monthly basis accessible to the respective salespersons and sales teams or sent via emails to the respective salesperson.

13. A computer system for improving a client business managed by salespersons and sales teams, comprising:
   a. a computer processor;
   b. a display;
   c. a memory system, comprising instructions, which when executed, cause the computer system to perform multiple programs to evaluate the effectiveness of a given advertising source in generating sales leads and monitoring how sales leads were handled including providing training to improve salesperson effectiveness and followup reporting to monitor sales efforts and training;
   d. said programs capable of analyzing performance of each of said salespersons, each of said sales teams and said client business, and further capable of assigning and managing leads which are optionally forwarded to an external lead management program;
   e. said programs assigning a series of local and/or toll-free telephone numbers to a client or said client business of a provider which provides said system to thereby determine specific sources of marketing of said client business, said provider assigning and placing a unique telephone number in each source of marketing or advertising;
   f. said programs refer routing, tracking and recording calls to or from clients or prospective clients, including automatically converting Internet leads to telephone contacts which are thereby captured, managed and reported;
   g. said programs determine which calls are mistakes or people seeking free advice as opposed to potential customers, wherein calls representing sales opportunities are separated and recorded from other types of calls which are removed to allow for a cost-per-lead analysis by marketing source and a closes-per-lead analysis by a salesperson from classifying performance of the respective salespersons based on a client questionnaire, wherein the respective scores are generated so that each salesperson's individual skill gaps are identified and specific training and coaching are recommended in accordance with said program; and
   h. said programs gather scores on an individual salesperson from said memory system in conjunction with said salesperson to determine what courses need to be taken based on said scores, if one of said courses is found, a completion date for said course is assigned to said salesperson, if said course is unavailable, a course work is provided, followup is performed to determine if said salesperson completes said course work and a manager of said salesperson is notified by an e-mail, these steps are repeated until said courses are completed and a data is sent to said database of said system, so that said system generates a knowledge based program report of said salesperson, which is displayed on a web page or e-mailed to said client and the appropriate management level person or persons.

14. The computer as claimed in claim 13, said programs further comprising: a hosted, learning management program system, which is custom branded to match a website of the respective clients or client businesses, said hosted, learning management program further providing a unique web page for each of said clients and salespersons featuring a digital photograph of each of said salespersons, various customizable fields, plus a list of all required or recommended training associated with job titles/positions of employees of said system, wherein said job titles are capable of being imported from human resources or payroll systems of the respective clients so that training requirements are automatically updated, therefore said web page of said system indicates a required completion date and completion status of each course, if said client elects to use a training content of said system, a self-paced course can be launched directly from said web page by clicking a button beside a course title, and instructor-led courses are capable of being scheduled by clicking a calendar button.

15. The computer as claimed in claim 13, further comprising: said salespersons are given pre- and post-learning tests to be sure they have learned the respective course materials, so that completion certificates are provided to management to advise said management which salespersons have or have not completed training and how each salesperson scored on pre- and post-learning examinations.

16. The computer as claimed in claim 13, wherein the computer further comprises programs automatically importing training from outside the computer and adding ad hoc classes by clients.

* * * * *